(12) United States Patent
Karlander (10) Patent No.: US 7,794,006 B2
(45) Date of Patent: Sep. 14, 2010

(54) BUMPER BEAM

(75) Inventor: Lars Karlander, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 126 days.

(21) Appl. No.: 11/919,562

(22) PCT Filed: May 23, 2006

(86) PCT No.: PCT/SE2006/000597

§ 371 (c)(1),
(2), (4) Date: Oct. 30, 2007

(87) PCT Pub. No.: WO2006/126941

PCT Pub. Date: Nov. 30, 2006

(65) Prior Publication Data

US 2009/0066095 A1  Mar. 12, 2009

(30) Foreign Application Priority Data

May 25, 2005  (SE) .................................. 0501173

(51) Int. Cl.
*B60R 19/02* (2006.01)
(52) U.S. Cl. ..................................... 296/102
(58) Field of Classification Search ............ 296/187.09, 296/187.03; 293/102, 142, 117, 120, 133; 256/59
See application file for complete search history.

(56) References Cited

U.S. PATENT DOCUMENTS

| | | | | |
|---|---|---|---|---|
| 4,116,480 A | * | 9/1978 | Crestetto | 293/102 |
| 4,599,843 A | * | 7/1986 | Ingvarsson | 296/146.6 |
| 5,722,708 A | * | 3/1998 | Jonsson | 293/102 |
| 6,290,282 B1 | * | 9/2001 | Hortlund et al. | 296/146.6 |
| 6,540,276 B2 | * | 4/2003 | Azuchi et al. | 293/102 |
| 6,554,345 B2 | * | 4/2003 | Jonsson | 296/146.6 |
| 6,779,821 B2 | * | 8/2004 | Hallergren | 293/133 |
| 6,817,652 B2 | * | 11/2004 | Graber et al. | 296/146.6 |
| 6,908,127 B2 | * | 6/2005 | Evans | 293/120 |
| 6,926,323 B2 | * | 8/2005 | Evans | 293/120 |
| 6,971,690 B2 | * | 12/2005 | Evans et al. | 293/102 |
| 7,316,432 B2 | * | 1/2008 | Muskos | 293/102 |
| 7,357,430 B2 | * | 4/2008 | Karlander | 293/102 |

(Continued)

FOREIGN PATENT DOCUMENTS

FR  2856023  12/2004

(Continued)

*Primary Examiner*—Kiran B. Patel
(74) *Attorney, Agent, or Firm*—Mark P. Stone (57) ABSTRACT

A bow-formed bumper beam for a vehicle has a hat profile with a central flange (11), two webs (12,13), and side flanges (14,15). The beam has fastening portions (20,21) at its sides where the side flanges form fastening areas (30-33) for fastening the beam to the vehicle with the central flange facing outwards. The profile height of the beam decreases continuously from the fastening portions towards the center so that the profile height is less than two third of the highest profile height at the fastening portions. The central flange is wider at its center than at its fastening portions and has a stiffener in the form of an elongate depression (16) that extends from the center of the beam towards the fastening portions. In the area between the fastening portions, the side flanges have bent edges (26,27) and in association with the beginning of the bent edges, the side flanges have transverse dents.

20 Claims, 6 Drawing Sheets

U.S. PATENT DOCUMENTS

| | | | |
|---|---|---|---|
| 7,357,432 B2 * | 4/2008 | Roll et al. | 293/133 |
| 2002/0121797 A1 * | 9/2002 | Jonsson | 296/146.6 |
| 2004/0135384 A1 * | 7/2004 | Pritchard et al. | 293/120 |
| 2004/0201255 A1 * | 10/2004 | Jonsson | 296/187.03 |
| 2006/0130940 A1 * | 6/2006 | Kollaritsch et al. | 148/518 |
| 2007/0176438 A1 * | 8/2007 | Tornberg | 293/102 |
| 2008/0203740 A1 * | 8/2008 | Mellis et al. | 293/102 |
| 2008/0284183 A1 * | 11/2008 | Johnson | 293/102 |
| 2009/0096223 A1 * | 4/2009 | Asplund | 293/102 |

FOREIGN PATENT DOCUMENTS

| | | |
|---|---|---|
| WO | 0066400 | 11/2000 |
| WO | 2005080141 | 9/2005 |
| WO | WO 2007084044 A1 * | 7/2007 |

* cited by examiner

BUMPER BEAM

TECHNICAL FIELD

This invention relates to a bow-formed bumper beam for a vehicle.

PRIOR ART

Usually, one strives to make bumper beams stiff so that their collapse is delayed in a crash against a barrier. In particular, for rear bumpers, the most common accident is, however, hitting a thin pole in a parking lot. A bumper beam that is strong in a crash against a barrier will not give way when hitting a thin pole that hits close to the centre of the vehicle, but it will collapse locally and bend. WO 00/66400 discloses a bumper beam that has a web height that is reduced towards it centre.

OBJECT OF INVENTION AND BRIEF DESCRIPTION OF THE INVENTION

It is an object of the invention to provide a bumper beam that is balanced to take up energy well in various types of crashes.

This is fulfilled primarily in that the beam has a hat profile with a central flange, two webs, and side flanges, the beam has fastening portions at its sides where the side flanges forms fastening areas for fastening the beam to the vehicle with the central flange facing outwards, the profile height of the beam decreases in a bow-form from the fastening portions towards the centre so that the profile height is less than two third of the highest profile height at the fastening portions, and the central flange is wider at its centre than at its fastening portions and has a stiffener in the form of an elongate depression that extends from the centre of the beam towards the fastening portions.

Preferably, the side flanges have bent edges between the fastening portions, which stiffen the beam.

Preferably but not necessarily, the hat beam has an open cross section, that is, it has no cover and it has no other elements that link the side flanges together.

A bumper beam according to the invention can suitably be fastened to supporting elements of the vehicle without intermediate crash boxes.

BRIEF DESCRIPTION OF THE DRAWINGS

The figures shows a bumper beam that is an example of embodiment of the invention.

The FIGS. 5-13 are cross sections taken as indicated by the respective lines 5-13 in FIG. 3.

BRIEF DESCRIPTION OF A SHOWN AND PREFERRED EMBODIMENT

The bumper beam shown in the figures is made of metal. It can suitably be made of hardenable sheet steel that is hot stamped and hardened in a single step in the so called press hardening process. The steel is high strength steel and it may have a yield point over 900 Mpa (N/mm$^2$), for example over 1100 or over 1200 Mpa.

The bumper beam is a bow-formed open hat beam (it has a hat profile) with a central flange 11, two webs 12,13 and two side flanges 14,15, and it has an open cross section. The webs and the central flange form the crown of the hat beam. The central portion of the central flange has an elongate stiffener in the form of a depression 16 that is at least 30 cm long. It can extend over at least a fifth of the length of the bumper beam. This depression can be deeper than shown and in an extreme case, it can be so deep that the beam will have the profile of a double hat. Alternatively, two narrower depressions can be used instead of one wider.

The beam has two fastening portions 20,21, in which the side flanges have flat portions 30-33 and lie in one and the same plane and have holes 22,23,24 in their flat portions so that they can be fastened by screws to flat fastening plates on the vehicle. The webs 12,13 have their highest portions in association with the fastening portions and lowest portions in its centre as can be seen from the cross sections 4-13. The profile height of the middle portion should be less than ⅔ of the highest profile height and preferable less than half thereof.

Figure 1:
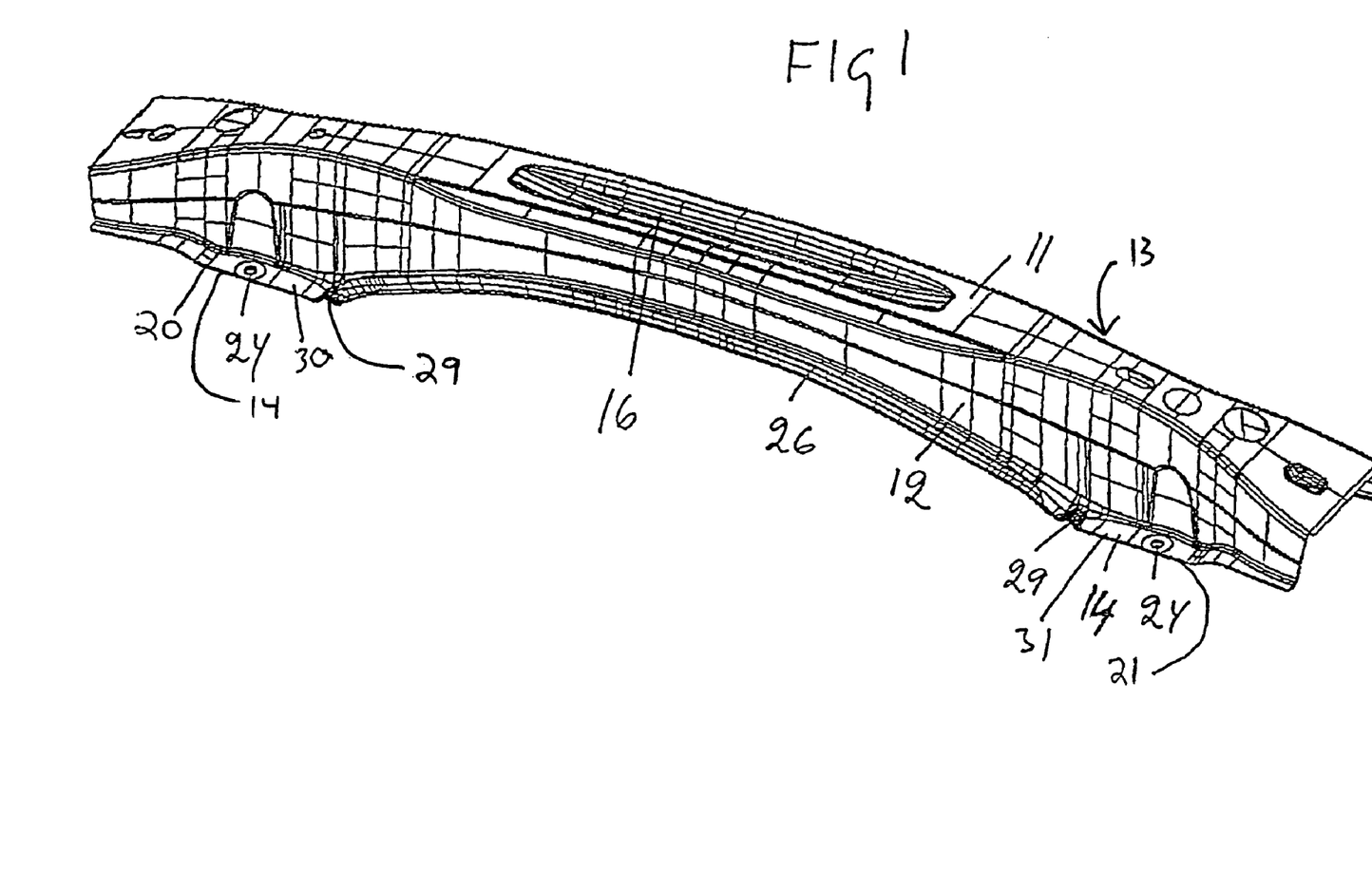
FIG. 1 is a perspective view of the bumper beam.
Figure 2:
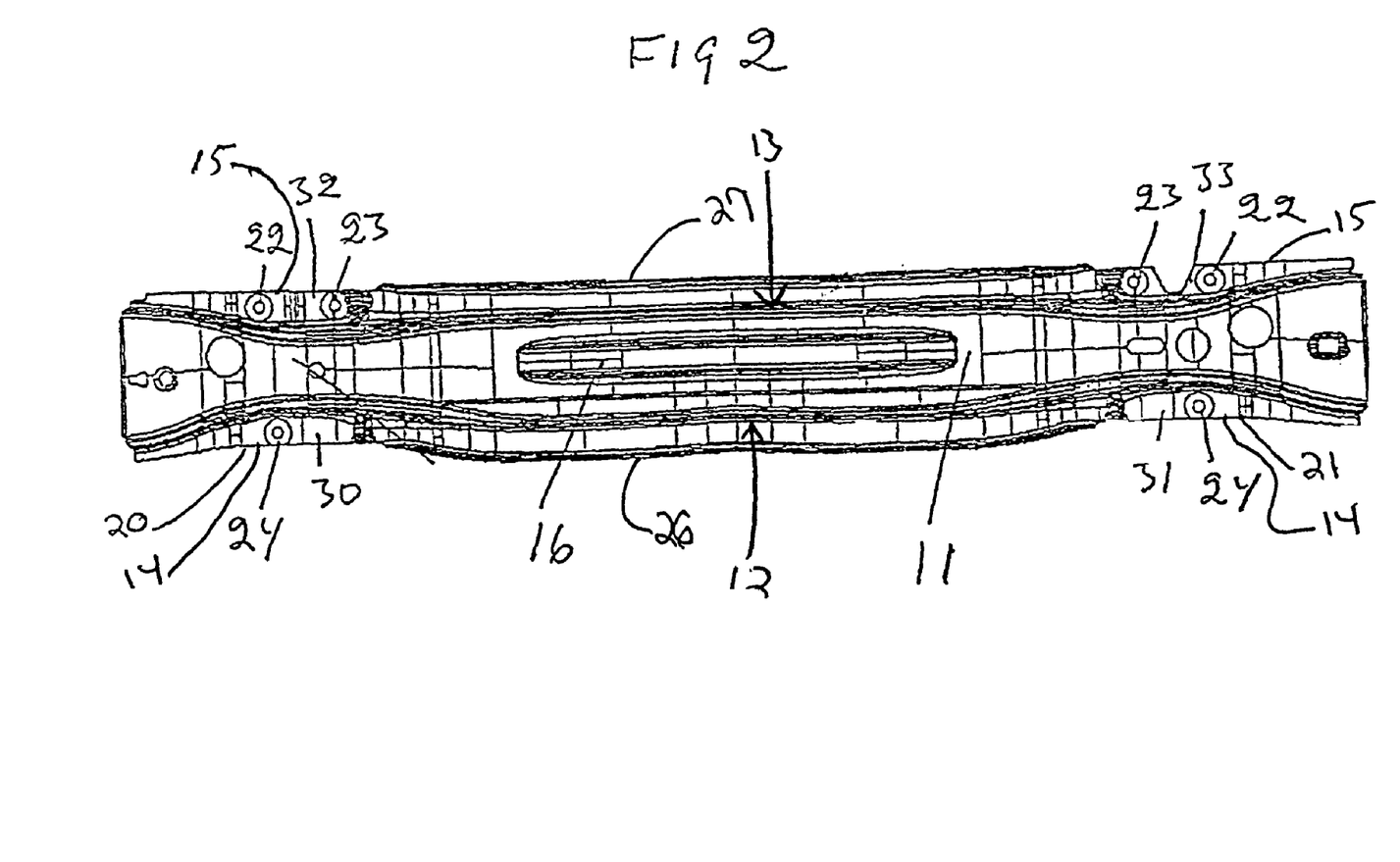
FIG. 2 is a front view of the bumper beam of FIG. 1.

As best illustrated by FIG. 1 of the drawings, the height of the bumper beam decreases continuously from the fastening portions 20, 21 towards the center flange 11, and as best illustrated by FIG. 2 of the drawings, the width of the bumper beam increases continuously from the fastening portions 20, 21 to the central flange 11.

The side flanges 14, 15 have bent edges 26, 27 all the way between the fastening portions 20, 21, whereas the side flanges have no bent edges at their fastening portions. The bent edges make the beam stiffer and provide-better deformation properties. The profile of the beam can be seen from the transverse sections 5-13 which are shown in one and the same scale and are self explanatory. The webs 12, 13 are somewhat convex in order to control the deformation. In the shown example of a bumper beam in accordance with the invention, the beam is somewhat asymmetric in cross section, which is due to the actual vehicle design and is not described in more detail. A number of holes and recesses depend also on the vehicle design and are not described in detail. They can for example be adapted to permit for a towing eyelet to pass the beam or be adapted for the positioning of the beam at its mounting.

Figure 4:
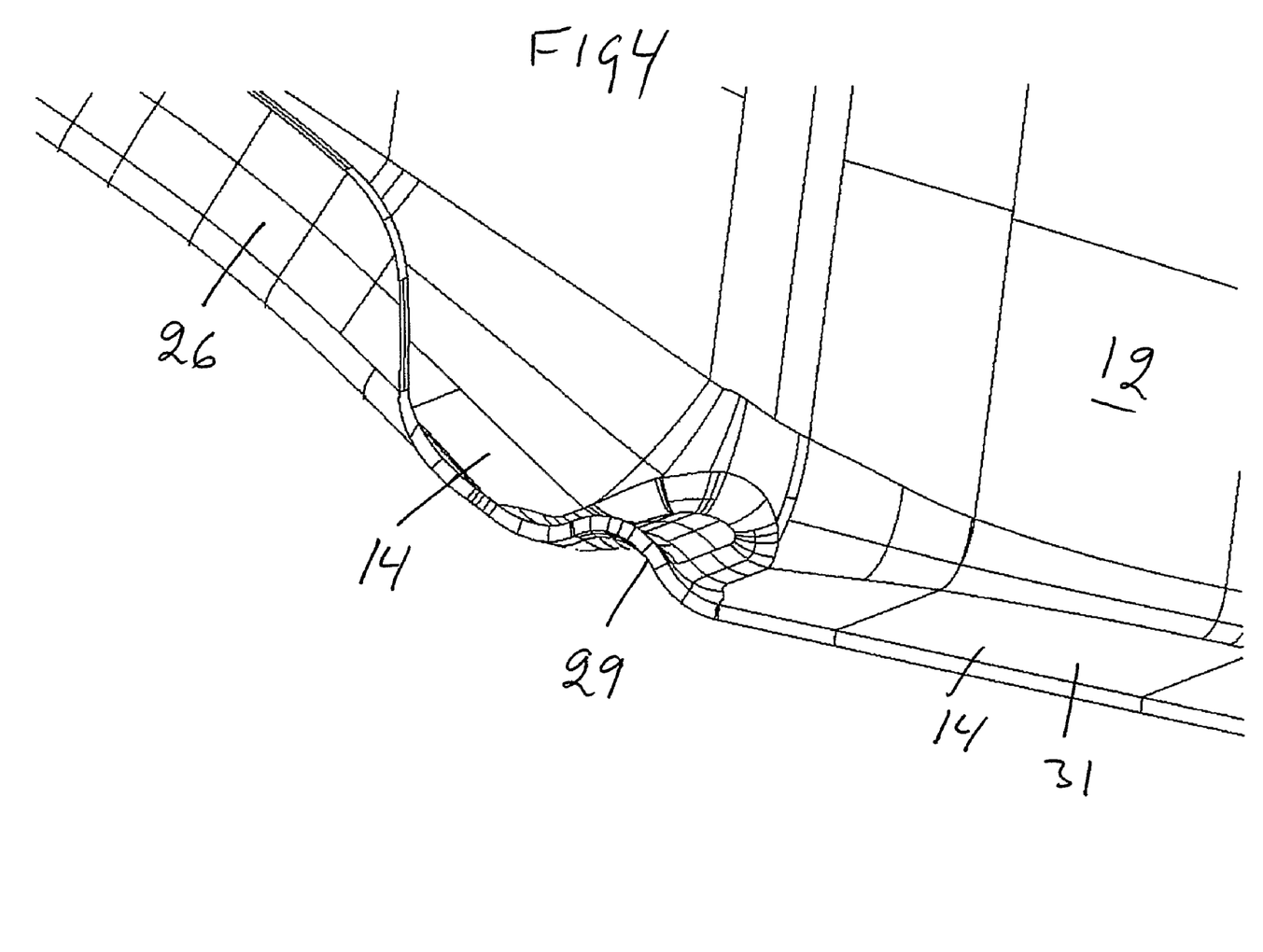
FIG. 4 shows, enlarged and in perspective, a small part of the bumper beam around the line 10 in FIG. 3.
Figure 5:
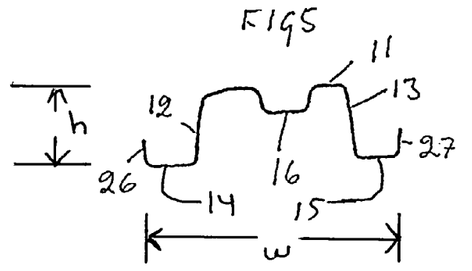
Figure 6:
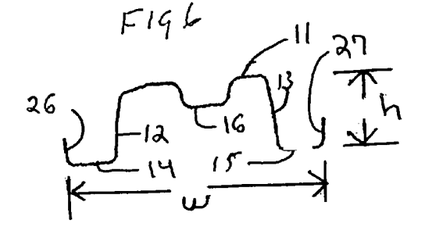
Figure 7:
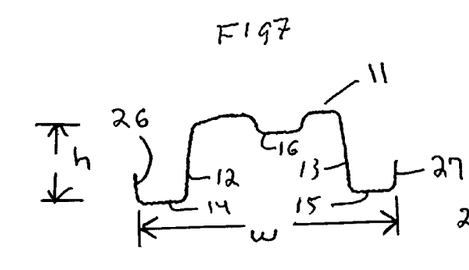
Figure 8:
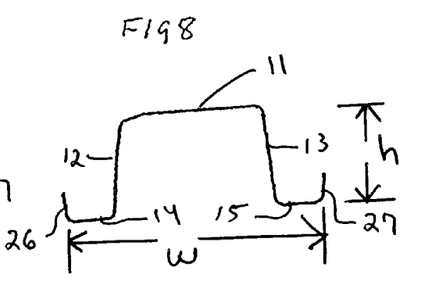
Figure 9:
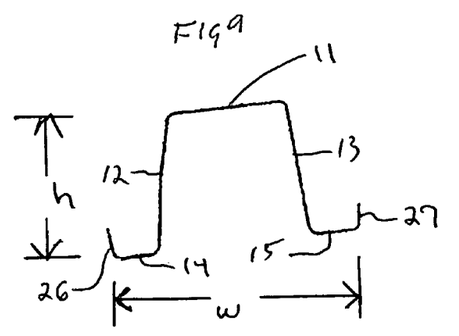
Figure 10:
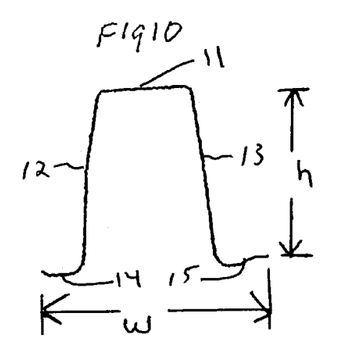
Figure 11:
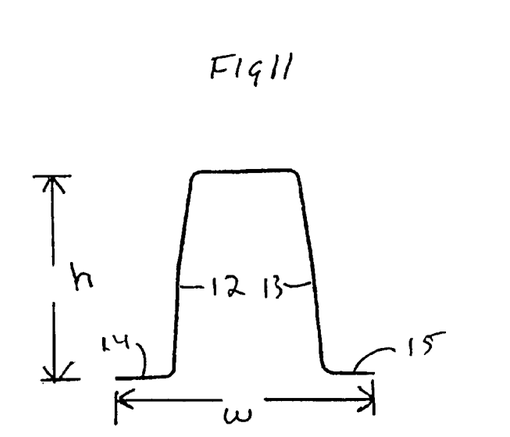
Figure 12:
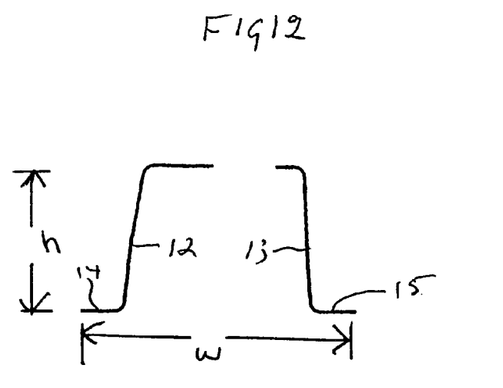
Figure 13:
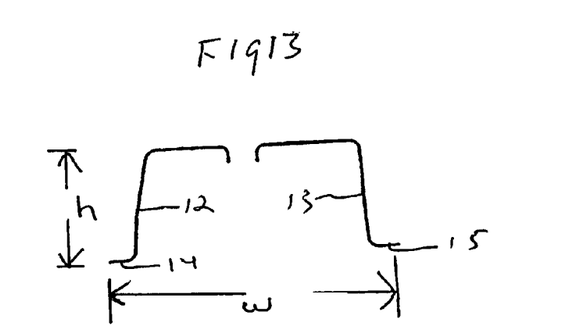

As best seen from FIG. 4, in all the transitions between the flat portions 30-33 of the side flanges 14,15 and the central portions of the side flanges with bent edges 26,27, the side flanges have transverse dents 29. These dents 29 in association with the beginning of the bent edges can readily be flattened out when the beam is bent in a collision and they reduce therefore the local tension in these sensitive portions of the side flanges and thereby they reduce the tendency of cracking.

Figure 3:
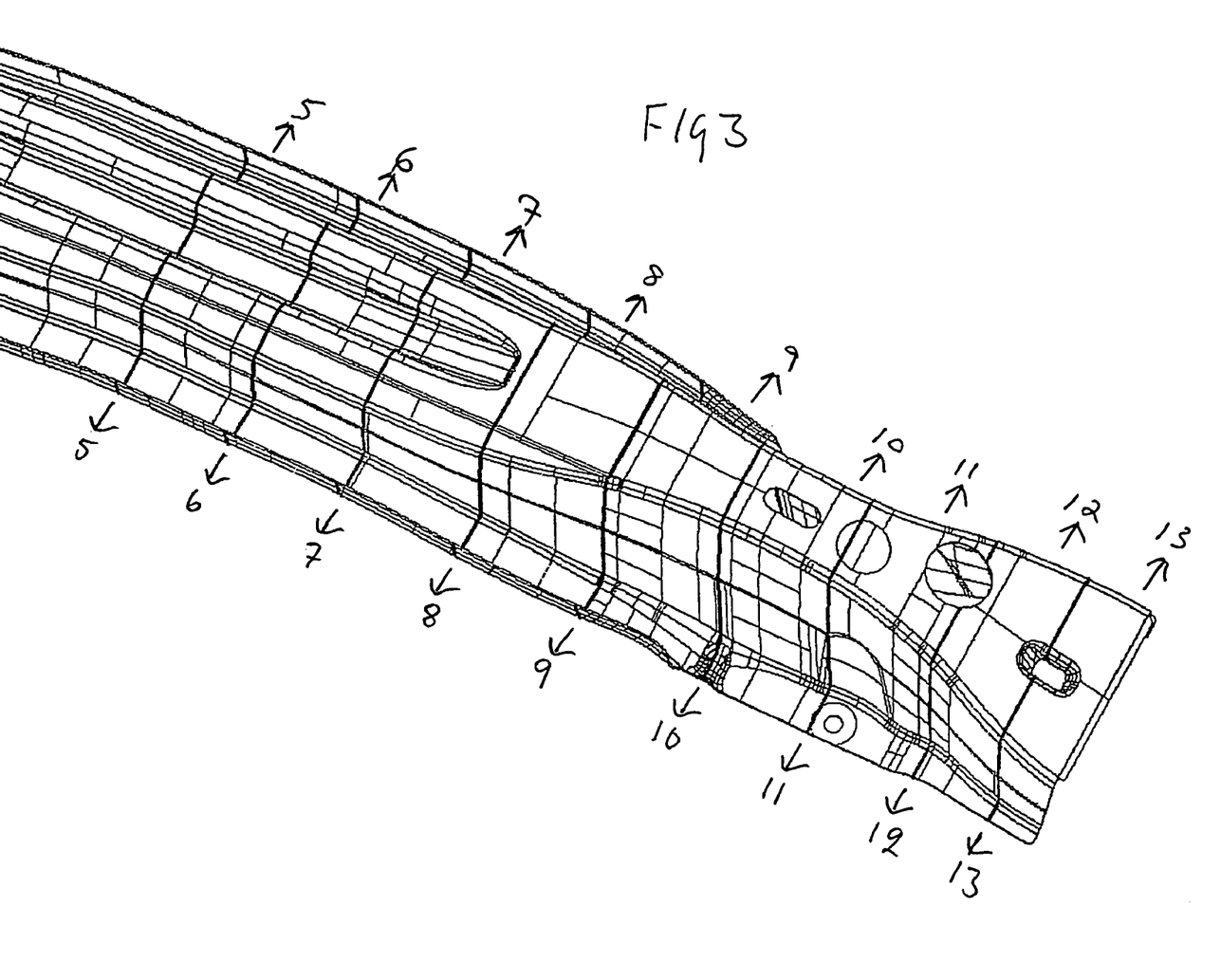
FIG. 3 is a perspective view of one end of the bumper beam of FIG. 1.

As indicated above, FIGS. 5-13 illustrate cross-sections of the beam illustrated by FIG. 3, along directional arrows 5-13, respectively. These drawings, and in particular, FIGS. 6-11, illustrate that the profile height of the bumper beam, designated by "h", decreases in a direction from the fastening portions at the opposed ends of the beam towards the center of the beam. FIGS. 6-11 also illustrate that the width of the bumper beam, designated by "w", increases in a direction from the fastening portions at the opposed ends of the beam towards the center of the beam.

Buckling of the bumper beam is more harmful the closer to the centre it is since the moment at midspan is the highest. If the profile is strong and does not bend, a thin pole will buckle the profile and result in a fast collapse. If the profile is more resilient by having a profile height that is reduced towards the middle of the beam, the buckling tendency will be reduced and the buckling will be delayed so that the motion of the beam towards the vehicle will be reduced. The depression 16 increases the strength against local buckling of the profile in the middle portion, but it does not hinder yielding. In a crash against a barrier, the beam will have reduced properties, but in accordance with the invention, an optimum compromise between the properties for various kinds of crashes will be achieved and better properties will be achieved generally.

The beam described above is made of hot stamped and hardened sheet steel, suitably in boron alloyed steel. Alternatively, it can be manufactured by cold forming of high-strength cold-forming steel. It need not necessarily be a functionally open profile as shown but it may have elements that link together its side flanges. It may also be made in another metal than steel, for example aluminium.

The invention claimed is:

1. A bumper beam for a vehicle, characterised in that
the beam has a hat profile with a central flange (11), two webs (12, 13), and side flanges (14, 15),
the beam has fastening portions (20, 21) at its sides where the side flanges form fastening areas (30-33) for fastening the beam to the vehicle with the central flange facing outwards,
the profile height of the beam continuously decreases in a bow-form from the fastening portions towards the center so that the profile height is less than two thirds of the highest profile height at the fastening portions, and
the width of the beam increases continuously from the fastening portions to the central flange so that the central flange is wider at its center than at its fastening portions and has a stiffener in the form of an elongate depression (16) that extends from the center of the beam towards the fastening positions.

2. The bumper beam according to claim 1, characterised in that the profile height at the middle of the beam is less than half the profile height at the fastening portions (20, 21).

3. The bumper beam according to claim 2, characterised in that the stiffening depression (16) has length of at least 30 cm.

4. The bumper beam according to claim 1, characterised in that the stiffening depression (16) extends over at least one fifth of the length of the beam and over less than half the length.

5. The bumper beam according to claim 1, characterised in that the central flange is wider over at least half the length between the fastening portions than its width at the fastening portions.

6. The bumper beam according to claim 1, characterised in that the central flange is wider over substantially the entire length between the fastening portions than its width at the fastening portions.

7. The bumper beam according to claim 1, characterised in that the side flanges have bent edges (26, 27) in the area between the fastening portions.

8. The bumper beam according to claim 5, characterised in that the side flanges (14, 15) have no bent edges at the fastening portions (20, 21).

9. The bumper beam according to claim 6, characterised in that the side flanges (14, 15) have transverse dents (29) in association with the beginning of the bent edges (26, 27) of the side flanges.

10. The bumper beam according to claim 1, characterised in that it has an open hat profile.

11. The bumper beam according to claim 2, characterised in that the stiffening depression (16) extends over at least one fifth of the length of the beam and over less than half the length.

12. The bumper beam according to claim 2, characterised in that the central flange is wider over at least half the length between the fastening portions than its width at the fastening portions.

13. The bumper beam according to claim 3, characterised in that the central flange is wider over at least half the length between the fastening portions than its width at the fastening portions.

14. The bumper beam according to claim 4, characterised in that the central flange is wider over at least half the length between the fastening portions than its width at the fastening portions.

15. The bumper beam according to claim 2, characterised in that the central flange is wider over substantially the entire length between the fastening portions than its width at the fastening portions.

16. The bumper beam according to claim 3, characterised in that the central flange is wider over substantially the entire length between the fastening portions than its width at the fastening portions.

17. The bumper beam according to claim 2, characterised in that the side flanges have bent edges (26, 27) in the area between the fastening portions.

18. The bumper beam according to claim 3, characterised in that the side flanges have bent edges (26, 27) in the area between the fastening portions.

19. The bumper beam according to claim 2, characterised in that it has an open hat profile.

20. The bumper beam according to claim 3, characterised in that it has an open hat profile.

* * * * *

UNITED STATES PATENT AND TRADEMARK OFFICE
CERTIFICATE OF CORRECTION

PATENT NO.         : 7,794,006 B2                                  Page 1 of 1
APPLICATION NO. : 11/919562
DATED              : September 14, 2010
INVENTOR(S)        : Lars Karlander It is certified that error appears in the above-identified patent and that said Letters Patent is hereby corrected as shown below:

Column 3, Line 38 Delete "positions" and substitute --portions--.

Signed and Sealed this

Sixteenth Day of November, 2010

David J. Kappos
*Director of the United States Patent and Trademark Office*